(12) United States Patent
Wu et al.

(10) Patent No.: US 11,095,570 B2
(45) Date of Patent: Aug. 17, 2021

(54) SCALING A NUMBER OF SEGMENTS IN A STREAM OF DATA BASED ON COMMUNICATION LOAD AND TREND DIRECTION

(71) Applicant: EMC IP Holding Company LLC, Hopkinton, MA (US)

(72) Inventors: Jeff Wu, Shanghai (CN); Ben Wang, Bothell, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 80 days.

(21) Appl. No.: 16/281,344

(22) Filed: Feb. 21, 2019

(65) Prior Publication Data

US 2020/0274822 A1 Aug. 27, 2020

(51) Int. Cl.
*H04L 12/917* (2013.01)

(52) U.S. Cl.
CPC .................... *H04L 47/76* (2013.01)

(58) Field of Classification Search
CPC ....... H04L 47/76; G06F 16/907; G06F 16/285
See application file for complete search history.

(56) References Cited

U.S. PATENT DOCUMENTS

| | | | | |
|---|---|---|---|---|
| 2008/0288947 A1* | 11/2008 | Gokhale | ............... | G06F 3/0613 718/103 |
| 2012/0331106 A1* | 12/2012 | Ramamurthy | ..... | H04N 21/6587 709/218 |

OTHER PUBLICATIONS

GitHub, "Proposal for rolling transaction in Pravega", URL: https://github.com/pravega/pravega/wiki/PDP-24:-Rolling-Transaction, May 18, 2020, 12 pages.
"Pravega Concepts." Pravega. http://pravega.io/docs/latest/pravega-concepts/#autoscaling-the-number-of-stream-segments-can-vary-over-time. Last Accessed Jan. 16, 2019. 21 pages.
Wu, et al. "Scaling Distributed Computing System Resources Based on Load and Trend" U.S. Appl. No. 16/223,950, filed Dec. 18, 2018, 51 pages.

* cited by examiner

*Primary Examiner* — El Hadji M Sall
(74) *Attorney, Agent, or Firm* — Amin, Turocy & Watson, LLP

(57) ABSTRACT

The described technology is generally directed towards automatically scaling segments of a stream of data. According to an embodiment, a system can comprise a memory that can store computer executable components, and a processor that can execute the computer executable components stored in the memory. The computer executable components can comprise a predictor that can predict a future communication load of a stream of data provided by a stream provider device, the stream comprising segments of a size. The computer executable components can further comprise a size changer that can receive an indication that a present communication load of the stream of data has transitioned a threshold, and change the size of a segment of the segments based on the indication and the future communication load of the stream of data.

20 Claims, 11 Drawing Sheets

SCALING A NUMBER OF SEGMENTS IN A STREAM OF DATA BASED ON COMMUNICATION LOAD AND TREND DIRECTION

TECHNICAL FIELD

The subject application generally relates to storage and transmission of streams of data, and, for example, to automatically changing a number of segments in a stream of data based on analyzing a communications load of the stream of data, and related embodiments.

BACKGROUND

In a stream storage system, streams of data can be segmented during delivery to enable different features, e.g., changing the quality of streamed content during delivery. Stream scaling is a feature that can increase or decrease the number of segments of a stream of data based on different characteristics of the stream. A typical way to determine whether to increase or decrease the number of segments in a stream of data is based a communication load of the stream of data, e.g., as the communication load on the stream of data increases and decreases the number of segments used in the stream of data can respectively be increased and decreased accordingly.

At times however, the measurement of communication load of a stream of data may not accurately reflect when a stream of data could benefit from an increase or decrease in a number of segments. As a result, basing segmentation determinations on present communication load measurements can cause the number of segments in a stream of data to be unnecessarily increased or decreased.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components comprise a predictor that can predict a future communication load of a stream of data that can be provided by a stream provider device, the stream comprising segments of a size. The computer-executable components further comprise a size changer that can receive an indication that a present communication load of the stream of data has transitioned a threshold and changes the size of a segment of the segments based on the indication and the future communication load of the stream of data.

According to another embodiment, a computer-implemented method can comprise predicting, by a system comprising a processor, a future communication load of a stream of data provided by a stream provider device, the stream comprising segments of a size. The computer-implemented method can further comprise receiving, by the system, an indication that a present communication load of the stream of data has satisfied a condition with respect to a threshold and changing, by the system, the size of a segment of the segments based on the indication and the future communication load of the stream of data.

According to another embodiment, a computer program product is provided. The computer program product can comprise machine-readable storage medium comprising executable instructions that, when executed by a processor, facilitate performance of operations comprising predicting a future communication load of a stream of data provided by a stream provider device, the stream comprising segments of a size. The executable instructions can also cause the processor to receive an indication that a present communication load of the stream of data exceeds or is below a threshold and change the size of a segment of the segments based on the indication and the future communication load of the stream of data.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards a predictable automatic scaling of a segmentation of a stream of data. In some embodiments, a measure of a communication load on the stream of data, in conjunction with a determined trend direction of the communication load can be used to determine whether to increase or decrease the number of segments in a stream of data. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
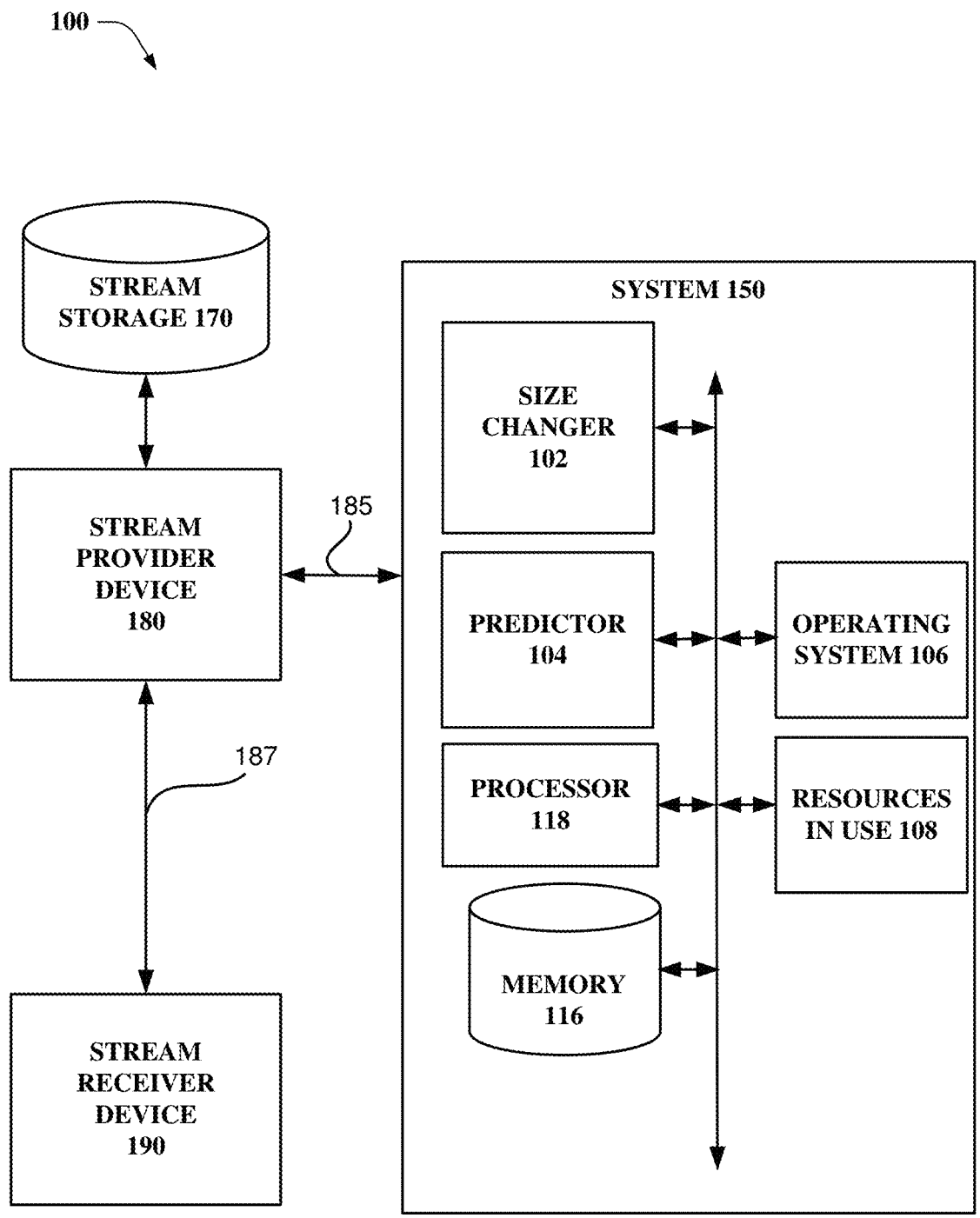
FIG. 1 illustrates a block diagram of an example, non-limiting system that can facilitate automatically scaling the segments of a stream of data, in accordance with various aspects and implementations of the subject disclosure.

FIG. 1 illustrates a block diagram 100 of an example, non-limiting system 150 that can facilitate automatically scaling the segments of a stream of data in accordance with various aspects and implementations of the subject disclosure. System 150 can be coupled 185 to a stream provider device 180. Stream provider device 180 can be coupled to a stream storage 170 and can provide a stream of data 187 to a stream receiver device 190. Stream of data 187 can be stored in stream storage 170.

System 150 as depicted includes operating system 106, such as a Linux®-based operating system, which can manage the resources in use 108. Note that resources in use 108 can in include resources in use for execution by processor 118, e.g., the Pravega® open-source streaming storage system by DELL EMC.

In one or more embodiments, system 150 can include predictor 104 and size changer 102. Predictor 104 can predict a future communication load of stream of data 187 at least in part by determining a trend direction of a present communication load of stream of data 187. In one or more embodiments, the trend direction can be, for example, a predicted increase, decrease or lack of change to the communication load over a period of time. As discussed further with FIG. 4 below, one approach used by one or more embodiments of predictor 104 predicts the trend direction of the communication load at least in part by applying a moving average convergence divergence analysis (MACD) to the present communication load and a past communication load.

As discussed further with FIGS. 3 and 5 below, in one or more embodiments, size changer 102 can receive an indication that a present communication load of stream of data 187 has a value that causes a scale event to occur. In one or more embodiments, there can be two types of scale events: scale-up event and scale-down event, the scale-up event being triggered by the communication load exceeding a scale-up threshold, and scale-down event being triggered by the communication load being lower than a scale-down threshold. In one or more embodiments, one or more of the thresholds for triggering the scale event can be set by a scaling policy. The scaling policy can, for example, be assigned to one or more of stream of data 187, stream provider device 180, stream receiver device 190, or similar components related to the stream of data.

As discussed further with the description of FIG. 6 below, in one or more embodiments, based on an indication of a scale-up event being received, size changer 102 can change the size of the segment at least in part by splitting the segment, thereby increasing a number of the segments in the stream of data. In one or more embodiments, based on an indication of a scale-down event being received, size changer 102 can change the size of the segment at least in part by merging the segment with another segment, thereby decreasing a number of the segments.

As used herein, a communication load of the stream of data generally refers to the input/output (I/O) load on the stream, e.g., a number of bytes per second written to stream of data 187 by stream provider device 180. In another embodiment, a communication load of the stream of data is a measure of a number of events per second written to stream of data 187 by stream provider device 180. It should also be noted that, in one or more embodiments, the communication load discussed herein can include values that represent an aggregate of multiple measurements, e.g., an average communication load.

As discussed further below with FIG. 11, in some embodiments, memory 116 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 116 are described below with reference to system memory 1116 and FIG. 11. Such examples of memory 116 can be employed to implement any embodiments of the subject disclosure.

According to multiple embodiments, processor 118 can comprise one or more types of processors and/or electronic circuitry that can implement one or more computer and/or machine readable, writable, and/or executable components and/or instructions that can be stored on memory 116. For example, processor 118 can perform various operations that can be specified by such computer and/or machine readable, writable, and/or executable components and/or instructions including, but not limited to, logic, control, input/output (I/O), arithmetic, and/or the like. In some embodiments, processor 118 can comprise one or more central processing unit, multi-core processor, microprocessor, dual microprocessors, microcontroller, System on a Chip (SOC), array processor, vector processor, and/or another type of processor. Further examples of processor 118 are described below with reference to processing unit 1114 and FIG. 11. Such examples of processor 118 can be employed to implement any embodiments of the subject disclosure.

Figure 2:
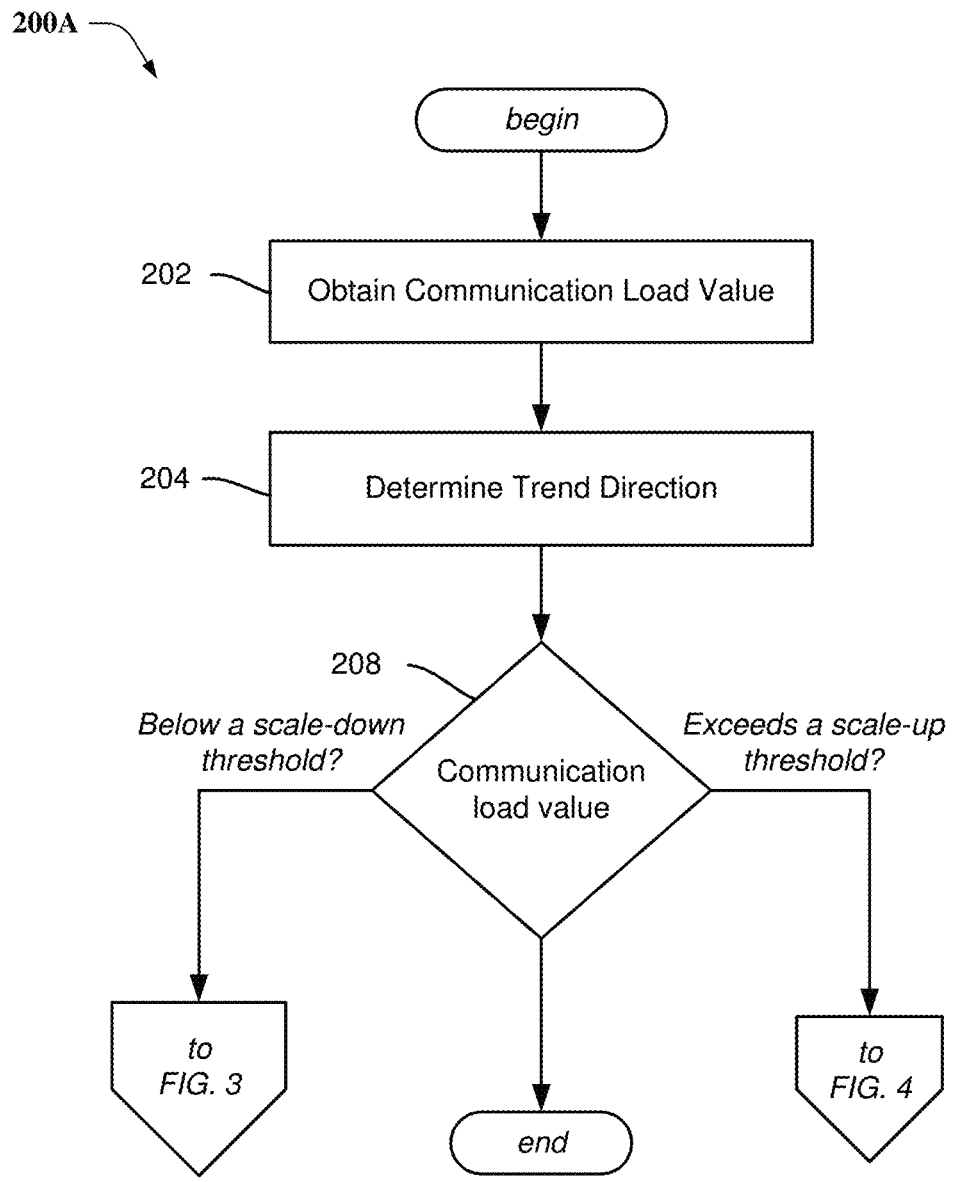
FIGS. 2-4 comprise a flow diagram that represents example operations for using a communication load and a determined communication load trend direction to automatically scale a number of segments in a stream of data, in accordance with various aspects and implementations of the subject disclosure.
Figure 3:
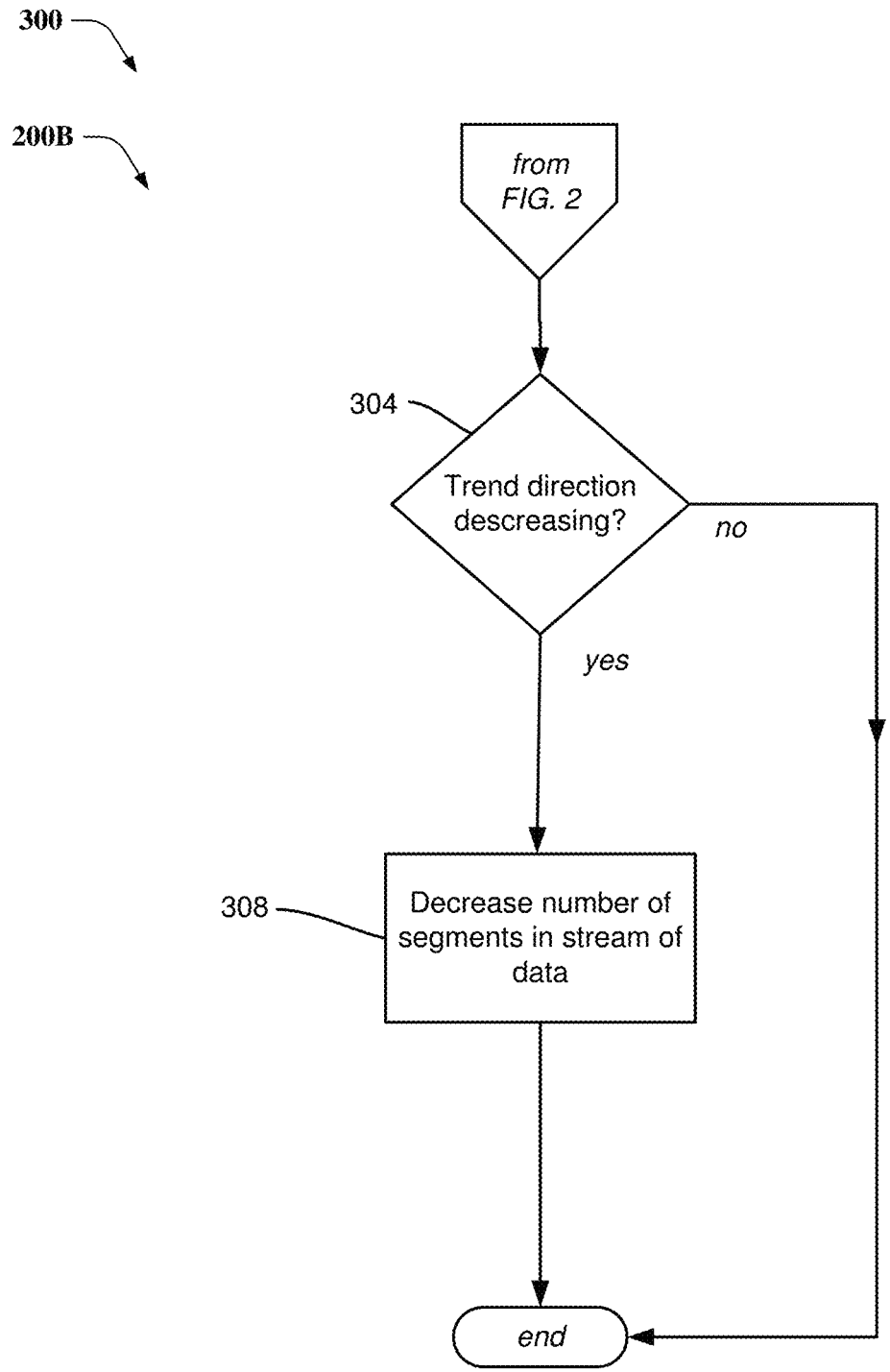
Figure 4:
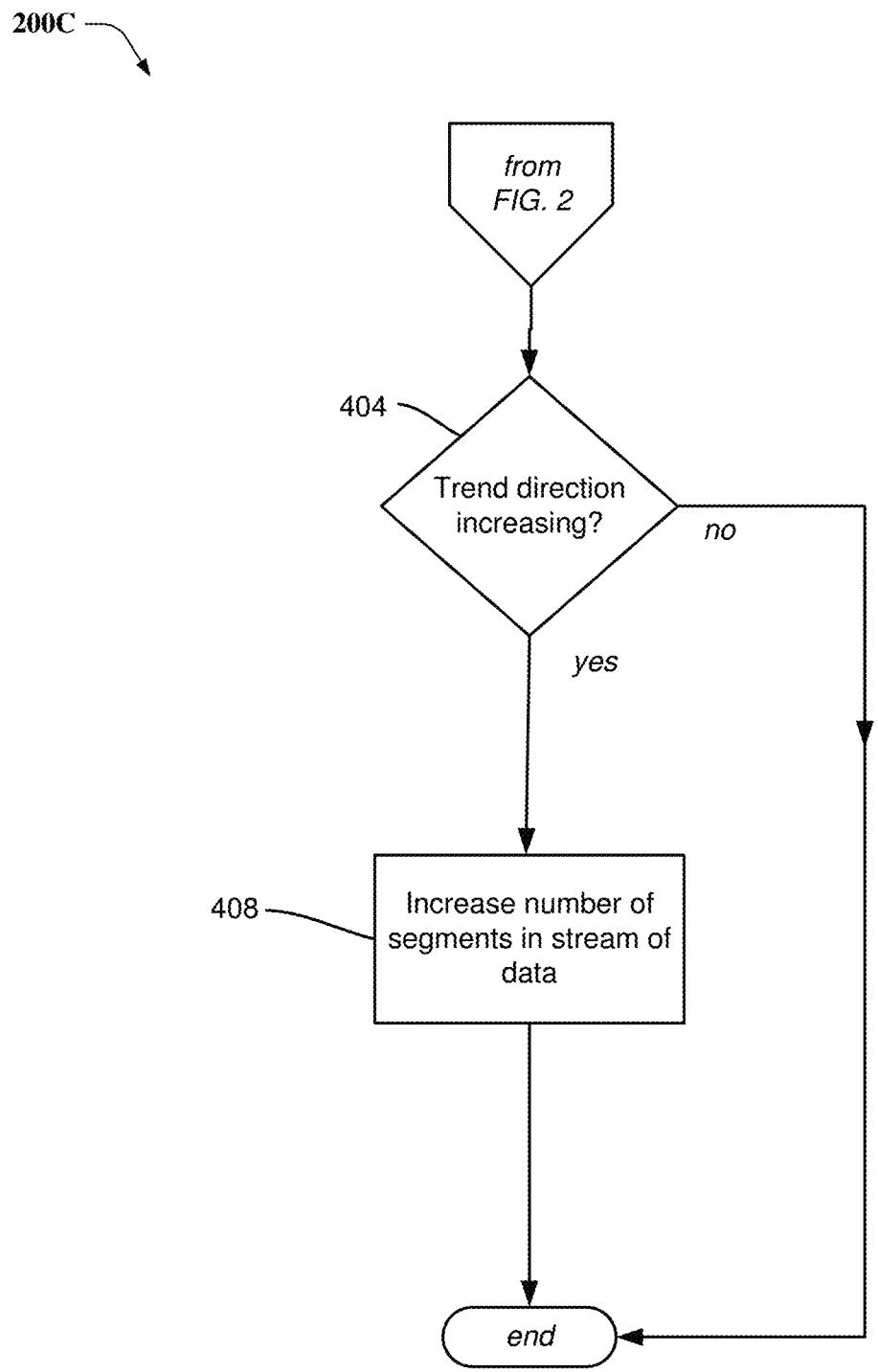

FIGS. 2-4 depict connected flow diagrams 200A-C exemplifying aspects of the scaling logic employed by one or more embodiments. For purposes of brevity, description of like elements and/or processes employed in other embodiments is omitted.

One or more embodiments can employ scaling logic that can be represented by the following pseudocode:

```
// CLoad = Communication load of the stream of data
// TREND ( ) = Function to determine a trend direction of the
communication load
D = TREND (CLoad) // return 1, or −1. 1, the trend is increasing, −1, the
    trend isdecreasing;
If (CLoad > scale-up threshold && D = 1), then split the stream segments
If (CLoad < scale-down threshold && D = −1), then merge the stream
segments
```

One or more embodiments can use operation 202 to obtain a present communication load value of a stream, e.g., pseudocode CLoad. In an example, using coupling 185, system 150 can receive an indication from stream provider device 180 that stream of data 187 is being delivered to stream receiver device 190 at a communication load of 16 kilobytes per second (kBps). Over time, in this example, stream receiver device requests a higher bitrate, and additional stream receiver devices also request delivery of stream of data 187. Continuing the example, system 150 can receive a second and third indication from stream provider device 180 that, based on the additional receiving devices and the increase in bitrate to stream receiver device 190, at two later instances of time, stream of data 187 has a communication load of 160 kBps and 1600 kBps, respectively. These example values are selected for convenience only, and do not necessarily reflect the use of one or more embodiments.

In this example, based on multiple communication load values received from stream provider device 180, in operation 204 a trend direction can be determined, e.g., an increasing trend direction (pseudocode D=1). At discussed herein, this trend direction can be determined based on different approaches, e.g., by employing MACD as described with FIG. 7 below. In one or more embodiments, a scaling policy similar to the scaling policy described with FIG. 1 above can specify one or more approaches used to determine the trend direction of stream of data 187.

At operation 208, in this example, scale-up and scale-down thresholds are applied to the communication load value of operation 202. Example scale-down and scale-up threshold values for this example are 20 kBps and 1200 kBps, respectively. In one or more embodiments, these threshold values can be pre-selected (e.g., set by the scaling policy described above) or dynamically calculated during operation of the system. Returning to the example communication load of 16 kBps, in operation 208, because this value is below the example scale-down threshold of 20 kBps, operation 208 determines to next execute operation 304 of FIG. 3, discussed below.

In another example of operation 208, for the second example communication load value of 160 kBps, because this value is nether below nor exceeds the scale-down and scale-up thresholds respectively, the operations of FIG. 2 end. In yet another example of operation 208, for the third example communication load of 1600 kBps, because this value exceeds the example scale-up threshold, operation 208 determines to next execute operation 404 of FIG. 4, discussed below.

FIG. 3 depicts flow diagram 200B, showing operations resulting from operation 208, determining that the present communication load (e.g., 16 kBps) is below the example scale-down threshold of 20 kBps.

In operation 304, the trend direction determined in operation 204 above is applied. In this example, the trend direction (e.g., TREND (CLoad) in pseudocode) was determined to be increasing, e.g., pseudocode D=1. In one or more embodiments, operation 304 determines whether the determined trend direction is decreasing and, because the determined trend direction in this example is not decreasing, the operation of FIG. 3 ends. In another example, where the trend direction is determined to be decreasing, operation 308 is performed.

In operation 308, the number of segments in stream of data 187 is decreased. In one or more embodiments, as discussed in greater detail with FIG. 6 below, one approach to reducing the number of segments in a stream of data is to merge existing segments together, resulting in fewer segments that can be larger than the previous segments.

FIG. 4 depicts flow diagram 200C, showing operations resulting from operation 208, determining that the present communication load (e.g., 1600 kBps) is above the example scale-up threshold of 1200 kBps.

In operation 404, the trend direction determined in operation 204 above is applied. In this example, the trend direction was determined to be increasing. In one or more embodiments, operation 404 determines whether the determined trend direction is increasing and, because the determined trend direction in this example is increasing, the operation 408 is performed.

In operation 408, the number of segments in stream of data 187 is increased. In one or more embodiments, as discussed in greater detail with FIG. 6 below, one approach to increasing the number of segments in a stream of data is to split existing segments, resulting in more segments that can be smaller than the previous segments. In operation 408, with an example where the trend direction is not increasing, the operations of FIG. 4 end.

Figure 5:
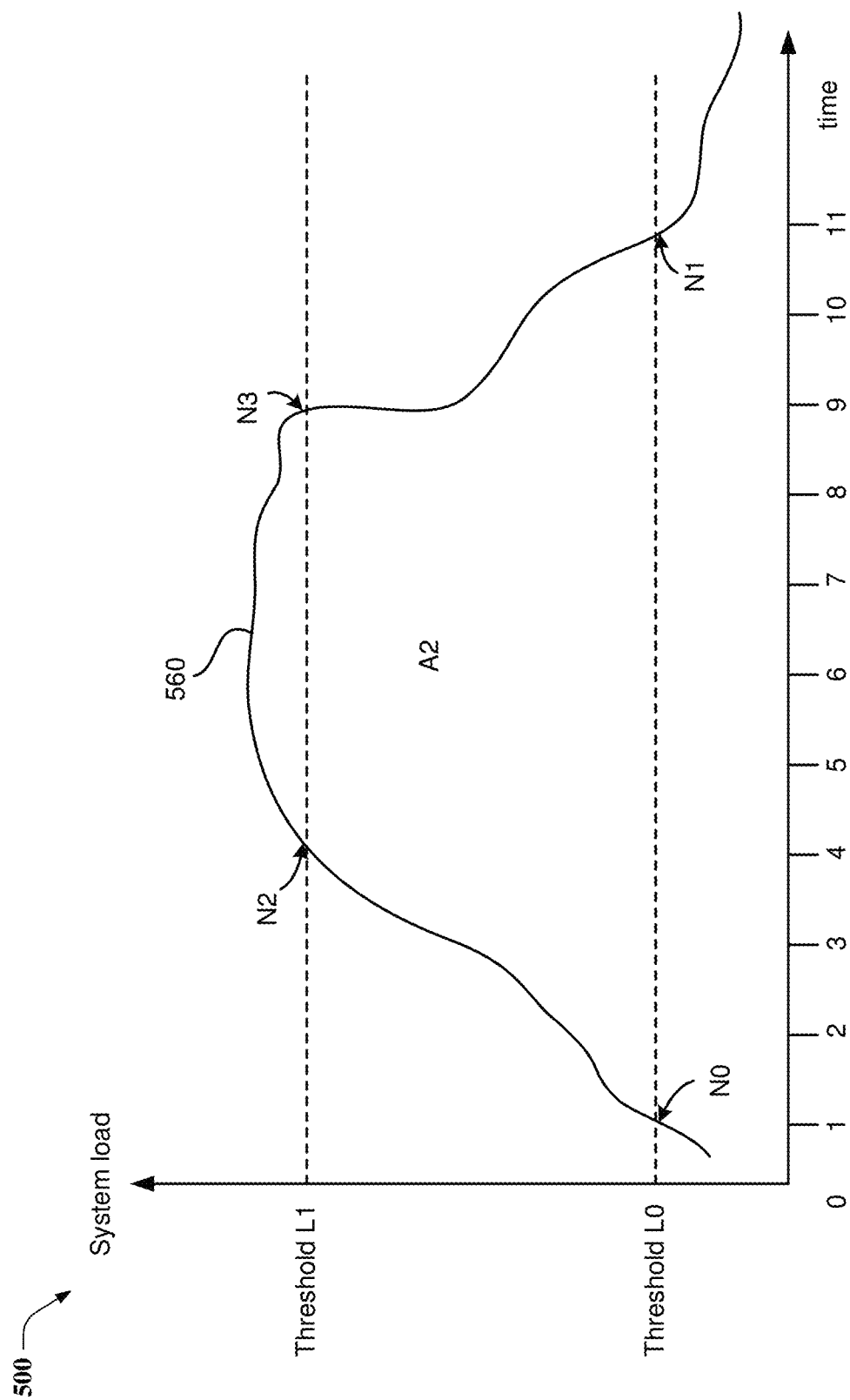
FIG. 5 is a chart of an example communication load over time of a stream of data, in accordance with various aspects and implementations of the subject disclosure.

FIG. 5 is an example chart 500 of a communication load 560 of a stream of data over time, in accordance with various aspects and implementations of the subject disclosure. For purposes of brevity, description of like elements and/or processes employed in other embodiments is omitted.

In this example, threshold L1 is the scale-up threshold (e.g., 1 MBps) and L0 is the scale-down threshold (e.g., 5 MBps). Based on this example, the four points on FIG. 5 (N0, N1, N2, and N3) are described below:

N0 point: N0<L0, and with a trend direction increasing, segments not merged N1 point: N1<L0, and with a trend direction decreasing, segments merged; N2 point: N2>L1, and with a trend direction increasing, segments split; N3 point: N3>L1, and with a trend direction decreasing, segments not split.

Without applying a determined trend direction, as described herein, point N0 (N0<L0) and N3 (N3>L1) would have been handled differently than the results above, e.g., merged and not split, respectively. With these two points, one or more embodiments can have a different, advantageous result, e.g., merging or segments to handle stream better and, for point N3, avoiding the unnecessary processing involved in splitting segments and handling the increased number of segments.

Figure 6:
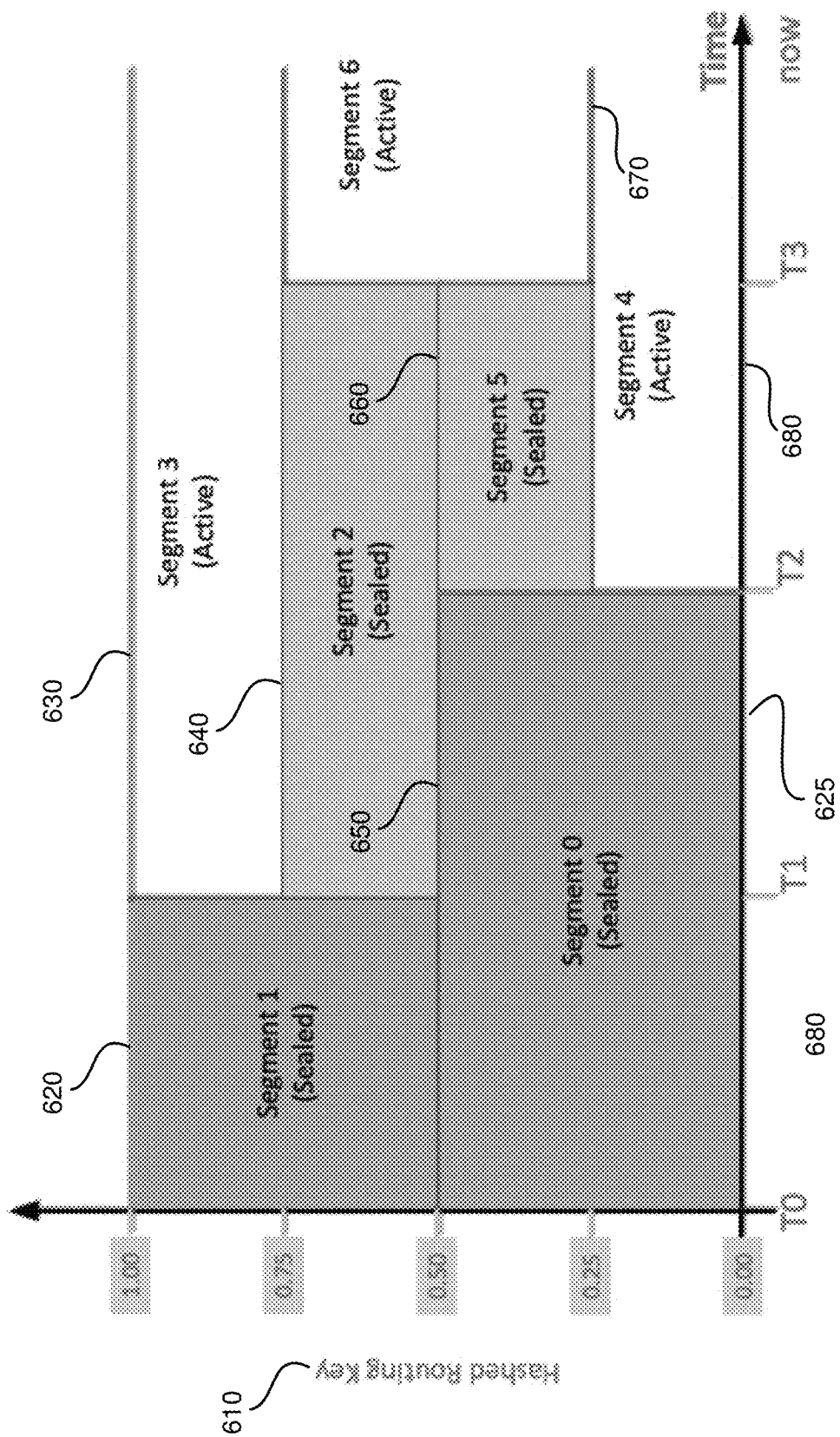
FIG. 6 illustrates an example of splitting and merging segments of a stream of data, in accordance with various aspects and implementations of the subject disclosure.

FIG. 6 illustrates a chart, which shows examples of splitting and merging segments in a stream of data 600, in accordance with various aspects and implementations of the subject disclosure. For purposes of brevity, description of like elements and/or processes employed in other embodiments is omitted.

In an example described below, times T0, T1, T2, and T3 are on the X-axis of the chart with example increases and decreases of communications load and changes in trend direction. On the Y-axis, a keyspace shows hashed routing keys that illustrate a size and number of segments in the stream of data 600.

At time T0, one or more embodiments do not determine that a segment merge or split is warranted, e.g., the rate of the data written to the stream has not changed. At time T1, in an example where the number of the bytes per second increased (from T0) to exceed the scale-up threshold, then the segment 1 (620) is split into two parts. In this example, segment 1 (620) is an event with a routing key (key value 0.5-1) hashed to the top of the key space, and segment 0 (625) is hashed to the lower part of the keyspace (key value 0-0.5). At time T1, based on operations of one or more embodiments described herein determining a scale-up event (e.g., communication load exceeds the scale-up threshold and trend direction is increasing), segment 1 (620) is split into segment 2 (640) and segment 3 (630). In one or more embodiments, after splitting, segments can be sealed and this designation prevents the system from further writing to the segment, e.g., splitting or merging the segment. In this example, segment 1 (620) is sealed based on the splitting described above.

Continuing this example, at time T1, newly created segment 3 (630) has a routing key between 0.75 and 1, created segment 2 (640) has a routing key between 0.5 and 0.749, and segment 0 (625) still accepts the same range of events (key value 0-0.5) as before T1.

At time T2, another scale-up event occurs, and segment 0 (625) is split into segment 4 (680) and segment 5 (660), and after splitting, segment 0 (625) is sealed to not accept further writes.

At time T3, in this example, one or more embodiments determine a scale-down event, e.g., communication load is below the scale-down threshold and trend direction is decreasing. Based on this scale-down event, segments that cover a contiguous range of key spaces can be merged. In this example, contiguous segment 2 (640) (key value 0.5-0.75) and segment 5 (660) (key value 0.25-0.5) can be merged into segment 6 (670) to accommodate the decrease in load on the stream determined by one or more embodiments. After merging, segment 2 (640) and segment 5 (660) are sealed, and segment 3 (630), segment 6 (670), and segment 4 (680) are active.

Figure 7:
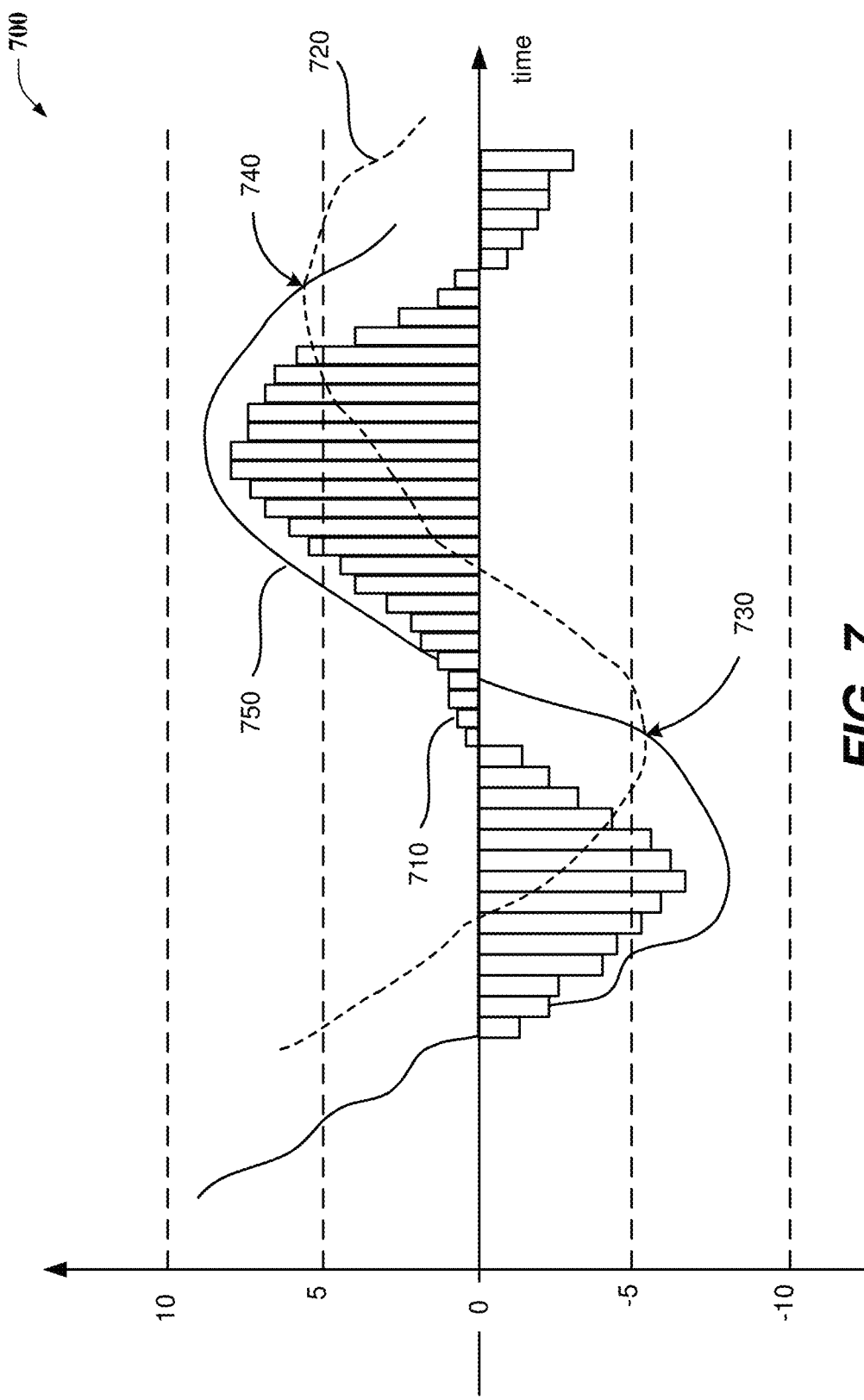
FIG. 7 is a graphical representation of an example approach to determining a trend direction of a communication load of a stream of data based on measurements of the communication load, in accordance with various aspects and implementations of the subject disclosure.

FIG. 7 is a graphical representation of an example approach to determining a trend direction of a communication load of a stream based on measurements of the communication load, in accordance with various aspects and implementations of the subject disclosure. For purposes of brevity, description of like elements and/or processes employed in other embodiments is omitted.

In this example, one or more embodiments can use a machine learning algorithm to predict the trend direction of the communication load on a stream of data. One machine learning algorithm that can be used by one or more embodiments is the MACD algorithm discussed above. In the MACD algorithm, the collected communication load of the stream of data is used as input, and the MACD algorithm can be used as a trend-following momentum and direction indicator that can show the relationship between two moving averages of loads. An MACD chart consists of three elements. The first, termed the MACD line 720, is the difference between the M-period and N-period exponential moving average (EMA) of the closing load average. The second, termed the signal line 750, is the EMA of the difference. The third, termed the histogram 710, is the MCAD line 720 minus the signal line 750.

FIG. 7 shows the MACD indicator can determine a trend direction for the communication load of a stream of data. In one or more embodiments, MACD line 720 follows the trend and is particularly suitable for determining when to trigger the auto scaling. In one or more embodiments, when the histogram 710 of the MACD chart is positive, then the trend direction is increasing, e.g., communication load is predicted to increase. Similarly, when the histogram 710 of the MACD chart is negative, then the trend direction is decreasing, e.g., communication load is predicted to decrease.

For example, point 730 is a point when the MACD line crosses from below to above the signal line 750 and thus the histogram goes from negative to positive, e.g., the trend direction is increasing, and the communication load is predicted to increase. Similarly, point 730 is a point when the MACD line crosses from above to below the signal line 750 and thus the histogram goes from positive to negative, e.g., the trend direction is decreasing, and the communication load is predicted to decrease.

Figure 8:
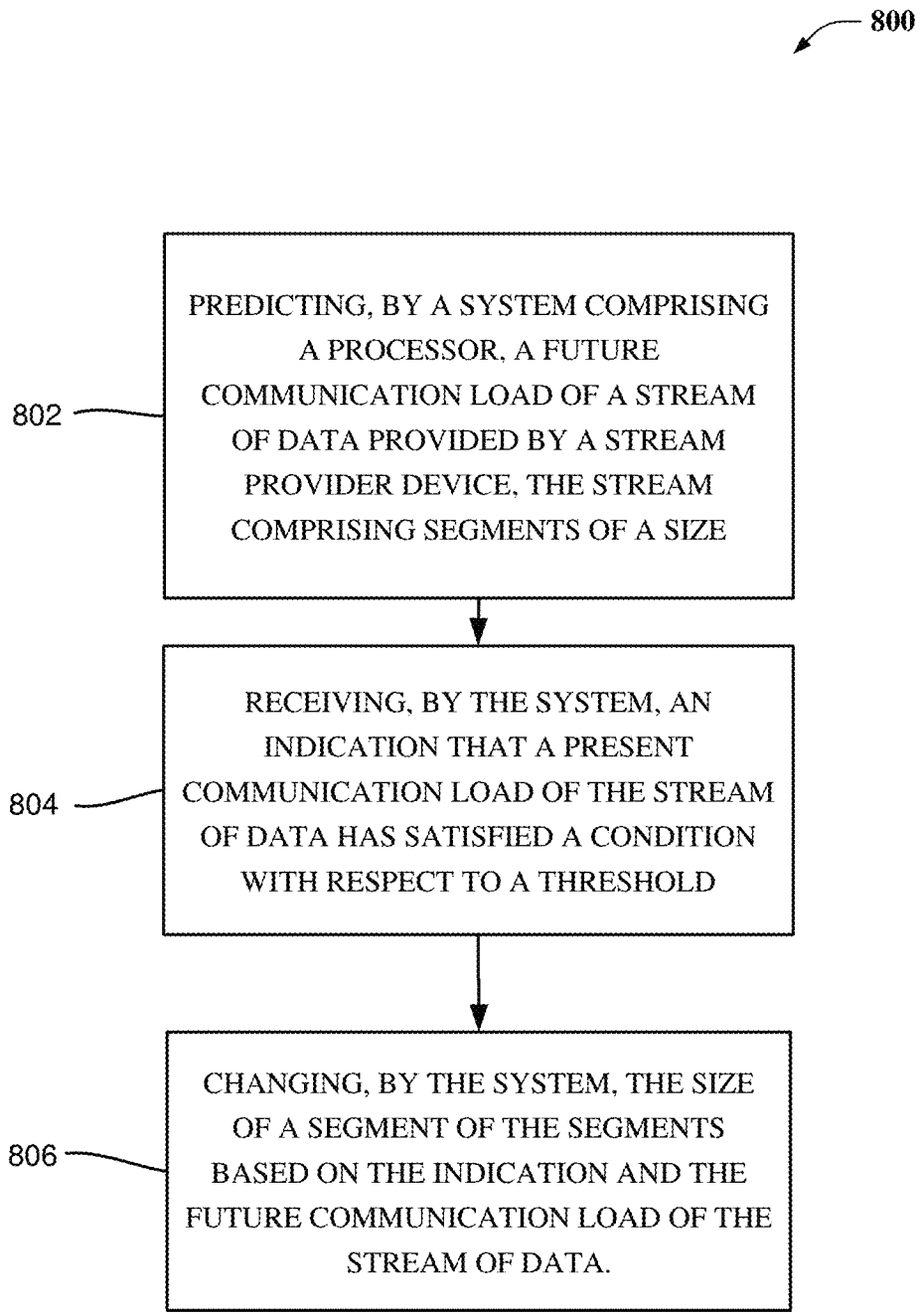
FIG. 8 is a flow diagram representing example operations for a method that can facilitate automatically scaling segments of a stream of data, in accordance with various aspects and implementations of the subject disclosure.

FIG. 8 illustrates an example flow diagram for a method 800 that can facilitate automatically scaling segments of a stream of data, in accordance with one or more embodiments. For purposes of brevity, description of like elements and/or processes employed in other embodiments is omitted.

At element 802, method 800 can comprise predicting (e.g., via predictor 104), by a system (e.g., system 150) comprising a processor (e.g., processor 118), a future communication load of a stream of data (e.g., stream of data 600) provided by a stream provider device (e.g., stream provider device 180), the stream comprising segments (e.g., segment 1 (620) and segment 2 (625)) of a size (e.g., key value is 0.5).

At element 804, the method 800 can further comprise receiving (e.g., via size changer 102), by the system, an indication (e.g., via coupling 185) that a present communication load of the stream of data has satisfied a condition (e.g., the condition being the communication load exceeding a threshold load) with respect to a threshold (e.g., size changer 102 receiving an indication that the present communication load satisfies the condition by exceeding a scale-up threshold). In an alternative embodiment, the condition can be that the communication load is below the threshold load, and size changer 102 can receive an indication that the present communication load satisfies the condition by being below a scale-down threshold.

At element 806, the method 800 can further comprise changing (e.g., via size changer 102), by the system, the size of a segment of the segments (e.g., segment 1 (620) can be changed in size by being split into segment 3 (630) and segment 2 (640)) based on the indication (e.g., exceeding the scale-up threshold) and the future communication load of the stream of data. In the alternative embodiment noted above, segment 2 (640) and segment 5 (660) can be changed in size by being merged together, based on the indication that the communication load satisfies the condition by being below the scale-down threshold.

Figure 9:
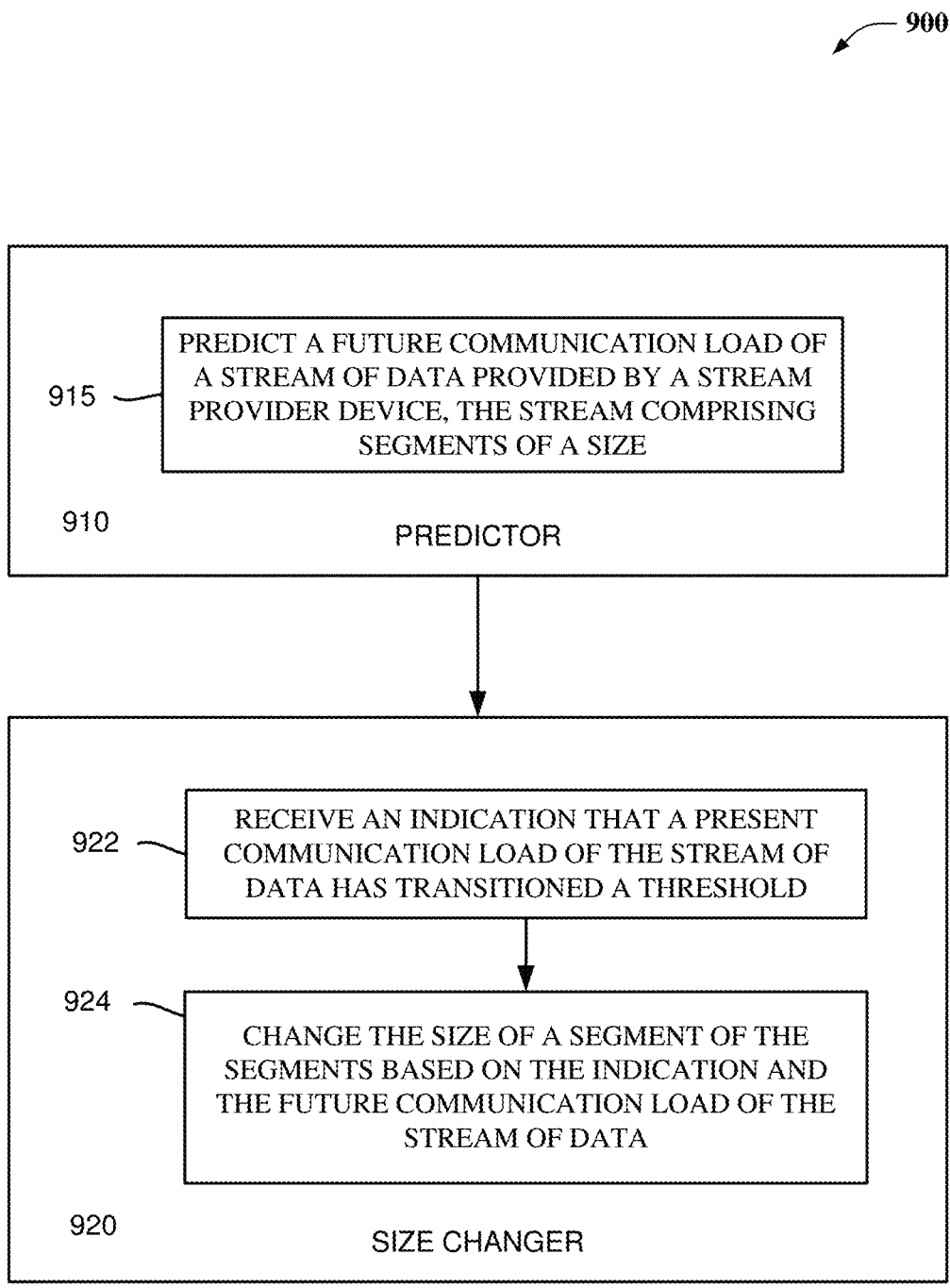
FIG. 9 is a flow diagram representing example operations of a predictor and a size changer in a system that can facilitate automatically scaling segments of a stream of data, in accordance with various aspects and implementations of the subject disclosure.

FIG. 9 is a flow diagram 900 representing example operations of a predictor 910 and a size changer 920 in a system that can facilitate automatically scaling segments of a stream of data, in accordance with various aspects and implementations of the subject disclosure. For purposes of brevity, description of like elements and/or processes employed in other embodiments is omitted.

Predictor 910 can be configured to predict a future communication load of a stream of data 187 provided by a stream provider device 108, the stream comprising segments (e.g., segment 1 (620) and segment 2 (625)) of a size.

Size changer 920 can be configured to receive an indication that a present communication load of the stream of data has transitioned a threshold (e.g., size changer 102 receiving an indication that the present communication load has transitioned a scale-up threshold by exceeding the threshold). In an alternative embodiment, size changer 102 can receive an indication that the present communication load has transitioned a scale-down threshold by being below the threshold.

Size changer 920 can be further configured to change the size of a segment of the segments based on the indication and the future communication load (e.g., the future communication load predicted by predictor 910) of the stream of data.

Figure 10:
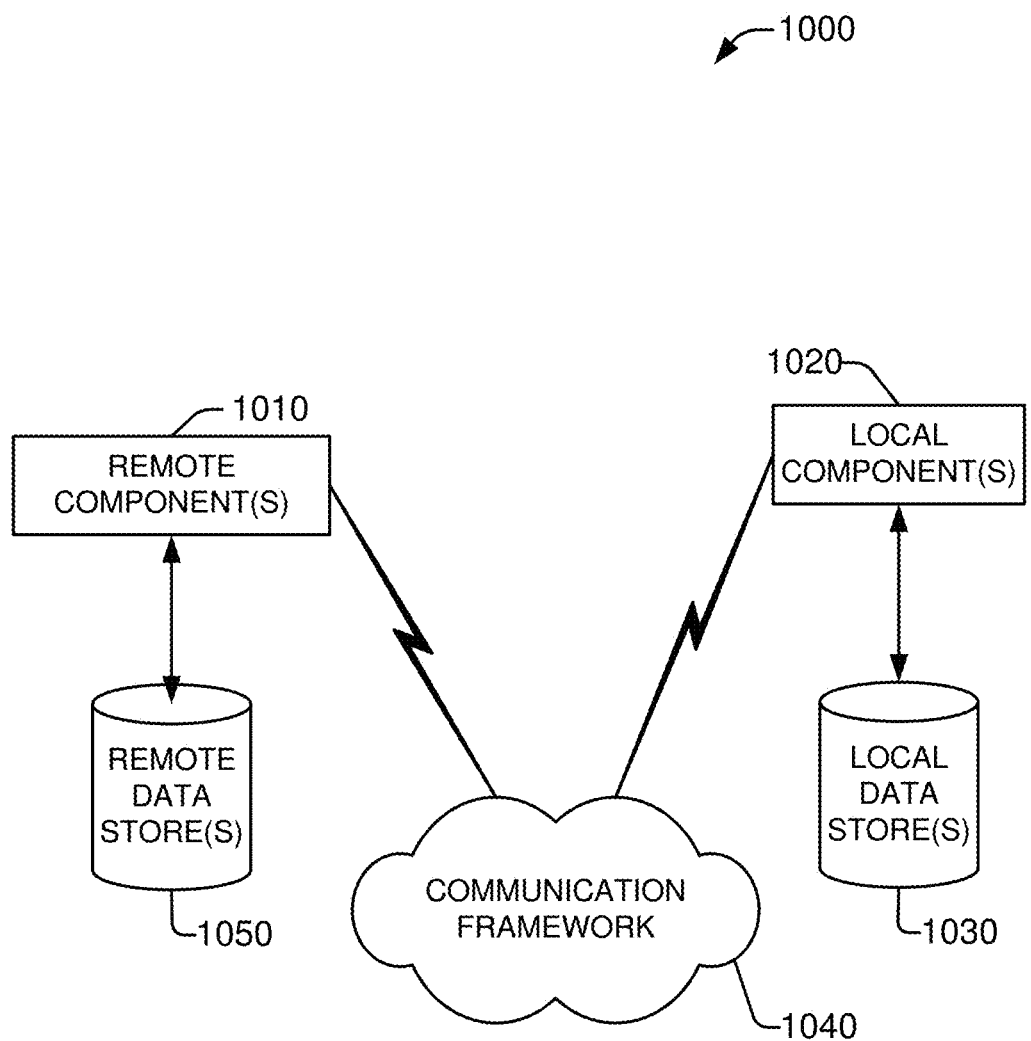
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise a size changer (e.g., size changer 102) and a predictor (e.g., predictor 104) and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
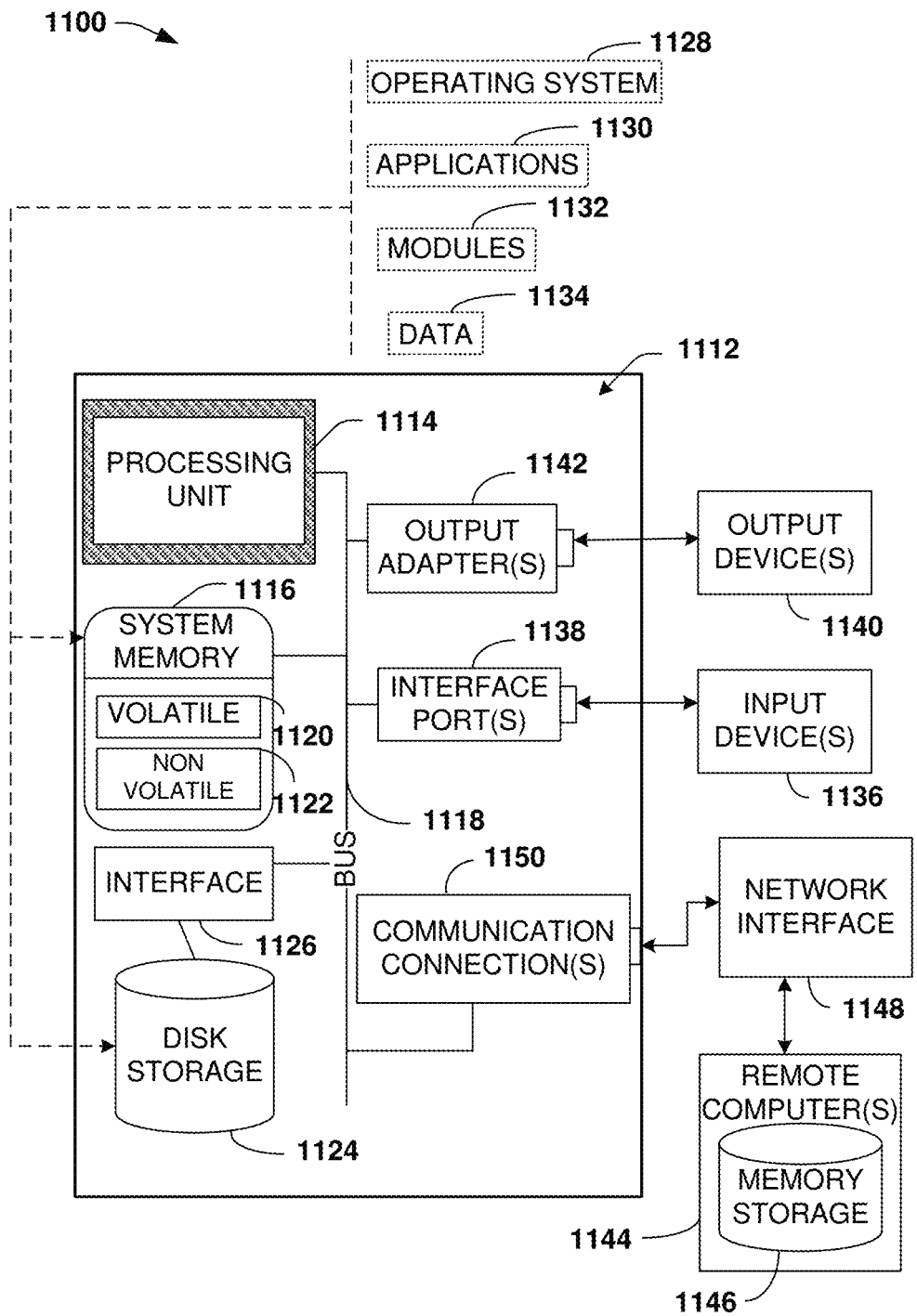
FIG. 11 illustrates an example block diagram of a computing system operable to execute the disclosed systems and methods in accordance with various aspects and implementations of the subject disclosure.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1022 (see below), disk storage 1024 (see below), and memory storage 946 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with one or more embodiments/implementations described herein. Computer 1112 can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial busport can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a memory that stores computer executable components; and
   a processor that executes the computer executable components stored in the memory, wherein the computer executable components comprise:
      a predictor that predicts a future rate of data to be written to a stream of data provided by a stream provider device resulting in a predicted data rate of the stream of data, the stream comprising segments of a size; and
      a size changer that receives an indication that a present rate of data written to the stream of data has transitioned a threshold, and changes the size of a segment of the segments based on the indication and the predicted data rate of the stream of data.

2. The system of claim 1, wherein the present rate of data written to the stream of data comprises a number of bytes per second written to the stream of data.

3. The system of claim 1, wherein the present rate of data written to the stream of data comprises a number of events per second written to the stream of data.

4. The system of claim 1, wherein, based on the indication that the present rate of data written to the stream of data exceeds the threshold, the size changer changes the size of the segment at least in part by splitting the segment, thereby increasing a number of the segments.

5. The system of claim 1, wherein, based on the indication that the present rate of data written to the stream of data is below the threshold, the size changer changes the size of the segment at least in part by merging the segment with another segment, thereby decreasing a number of the segments.

6. The system of claim 1, wherein the size changer changes the size of the segment further based on a scaling policy of the stream of data.

7. The system of claim 1, wherein the predictor predicts the predicted data rate at least in part by determining a trend direction of the present rate of data written to the stream of data.

8. The system of claim 1, wherein the predictor predicts the predicted data rate at least in part by applying a moving average convergence divergence analysis to the present rate of data written to the stream of data and a past rate of data written to the stream of data.

9. A method, comprising:
   predicting, by a system comprising a processor, a predicted rate of writing data to a stream of data provided by a stream provider device, the stream comprising segments of a size;
   receiving, by the system, an indication that a present rate of writing data to the stream of data has satisfied a condition with respect to a threshold load; and
   changing, by the system, the size of a segment of the segments based on the indication and the predicted rate of writing data to the stream of data.

10. The method of claim 9, wherein the present rate of writing data to the stream of data comprises a number of bytes per second written to the stream of data.

11. The method of claim 9, wherein the present rate of writing data to the stream of data comprises a number of events per second written to the stream of data.

12. The method of claim 9, wherein, based on the indication indicating that the present rate of writing data to the stream of data has exceeded the threshold load, the changing the size of the segment comprises splitting the segment, thereby increasing a number of the segments.

13. The method of claim 9, wherein, based on the indication indicating that the present rate of writing data to the stream of data is less than the threshold load, the changing the size of the segment comprises merging the segment with another segment, thereby decreasing a number of the segments.

14. The method of claim 9, wherein the changing the size of the segment of the segments is further based on a scaling policy of the stream of data.

15. The method of claim 9, wherein the predicting the predicted rate of writing data to the stream of data comprises determining a trend direction of the present rate of writing data to the stream of data.

16. The method of claim 9, wherein the predicting the predicted rate of writing data to the stream of data comprises applying a moving average convergence divergence analysis to the present rate of writing data to the stream of data and a past rate of writing data to the stream of data.

17. A non-transitory machine-readable medium comprising executable instructions that, when executed by a processor, facilitate performance of operations, the operations comprising:
   predicting a predicted writing rate of data to a stream of data provided by a stream provider device, the stream comprising segments of a size;
   receiving an indication that a present writing rate of data to the stream of data exceeds or is below a threshold; and
   changing the size of a segment of the segments based on the indication and the predicted writing rate of data to the stream of data.

18. The non-transitory machine-readable medium of claim 17, wherein the present writing rate of data to the stream of data comprises a number of bytes per second written to the stream of data.

19. The non-transitory machine-readable medium of claim 17, wherein the changing the size of the segment of the segments is further based on a scaling policy of the stream of data.

20. The non-transitory machine-readable medium of claim 17, wherein the predicting the predicted writing rate of data to the stream of data comprises determining a trend direction of the present writing rate of data to the stream of data.

* * * * *